(12) United States Patent
Ahmed et al.

(10) Patent No.: US 10,119,606 B2
(45) Date of Patent: Nov. 6, 2018

(54) VALVE TRAIN RETENTION CLIP WITH INTEGRATED LOCKING PIN ANTI-ROTATION FEATURE

(71) Applicant: Schaeffler Technologies AG & Co. KG, Herzogenaurach (DE)

(72) Inventors: Faheem Ahmed, Troy, MI (US); Colin Foster, Belle River (CA); Michael Kugler, Vestenbergsgreuth (DE); Philipp Streit, Neustadt/Aisch (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 78 days.

(21) Appl. No.: 15/446,664

(22) Filed: Mar. 1, 2017

(65) Prior Publication Data

US 2018/0252306 A1   Sep. 6, 2018

(51) Int. Cl.
| | |
|---|---|
| *F16H 53/06* | (2006.01) |
| *F01L 1/12* | (2006.01) |
| *F01L 1/04* | (2006.01) |
| *F01L 1/24* | (2006.01) |
| *F01L 1/18* | (2006.01) |

(52) U.S. Cl.
CPC ............... *F16H 53/06* (2013.01); *F01L 1/18* (2013.01); *F01L 1/185* (2013.01); *F01L 1/2405* (2013.01); *F01L 1/04* (2013.01); *F01L 1/12* (2013.01); *F01L 1/24* (2013.01); *F01L 2001/187* (2013.01); *F01L 2105/00* (2013.01); *Y10T 74/20882* (2015.01)

(58) Field of Classification Search
CPC ......... F16H 53/06; F01L 2105/00; F01L 1/12; F01L 1/04; F01L 1/24; F01L 1/185; F01L 2001/187; F01L 1/2405; F01L 1/18; Y10T 74/20882
See application file for complete search history.

(56) References Cited

U.S. PATENT DOCUMENTS

| | | | |
|---|---|---|---|
| 5,775,280 A | 7/1998 | Schmidt et al. | |
| 6,047,675 A | 4/2000 | Kunz | |
| 7,673,601 B2 | 3/2010 | Spath et al. | |
| 8,215,275 B2 * | 7/2012 | Church | F01L 1/185 |
| | | | 123/90.39 |
| 9,091,187 B2 | 7/2015 | Clever et al. | |
| 2003/0209217 A1* | 11/2003 | Hendriksma | F01L 1/182 |
| | | | 123/90.44 |

(Continued)

FOREIGN PATENT DOCUMENTS

| | | | | |
|---|---|---|---|---|
| DE | 102015214849 A1 * | 2/2017 | ............... | F01L 1/185 |
| DE | 102016203072 A1 * | 8/2017 | ................ | F01L 1/18 |

*Primary Examiner* — Mark Laurenzi
*Assistant Examiner* — Wesley Harris
(74) *Attorney, Agent, or Firm* — Volpe and Koenig, P.C.

(57) ABSTRACT

A clip for a switchable roller finger follower that includes a retainer for a hydraulic lash adjuster, and an anti-rotation feature that prevents rotation of a coupling pin is provided. The clip includes a first leg arranged adjacent to a dome-shaped recess on a bottom surface of an outer lever of the switchable roller finger follower that includes a retainer for the hydraulic lash adjuster, and a second leg of the clip includes an anti-rotation bar that extends laterally across a part of the coupling pin and prevents rotation of the coupling pin. A switchable finger follower with the clip is also provided.

14 Claims, 6 Drawing Sheets

(56) References Cited

U.S. PATENT DOCUMENTS

| | | | |
|---|---|---|---|
| 2006/0144356 A1* | 7/2006 | Sellnau | F01L 1/185 |
| | | | 123/90.16 |
| 2011/0226208 A1 | 9/2011 | Zurface et al. | |
| 2014/0283775 A1 | 9/2014 | Brune et al. | |
| 2016/0102584 A1 | 4/2016 | Evans et al. | |

* cited by examiner

VALVE TRAIN RETENTION CLIP WITH INTEGRATED LOCKING PIN ANTI-ROTATION FEATURE

FIELD OF INVENTION

This invention is generally related to a switchable roller finger follower, and is more particularly related to a retainer clip for a switchable roller finger follower.

BACKGROUND

Switchable roller finger followers with varying lift modes are known. Typically, such finger followers have an outer lever with one end that contacts a valve stem. An inner lever is located within a cavity of the outer lever and houses a cam follower that contacts a cam to provide motion to the finger follower to open or close a valve. One end of the outer lever or the inner lever is supported on a hydraulic lash adjuster. A coupling device is used to lock the inner lever in a fixed position relative to the outer lever. When the inner lever is locked to the outer lever via the coupling device, the movement translated by the cam to the finger follower is translated into movement of the valve via the valve stem. In order to switch the finger follower to a different lift mode or to deactivate the finger follower, the coupling device is released and the inner lever is unlocked and can travel freely up and down in conjunction with the cam without transferring the cam motion to the outer lever and valve stem.

One known type of coupling device includes a coupling pin that moves longitudinally between the inner lever and the outer lever to switch between a locked mode and an unlocked mode. The coupling pin is positioned within one of the inner lever or the outer lever, and the coupling pin has a coupling flat that engages with a coupling projection formed on the other one of the inner lever or the outer lever. It is critical to prevent rotation of the coupling pin so that the coupling flat remains rotationally aligned with the coupling projection to allow for reliable engagement when the coupling device is engaged. One known type of anti-rotation feature is shown in FIG. 1, which illustrates a switchable roller finger follower 1 according to the prior art having an outer lever 2 and an inner lever 4. A transversely mounted pin or needle 3 extends over a coupling flat 7 of the coupling pin 5. The transversely mounted needle 3 performs the sole function of preventing rotation of the coupling pin 5. Also shown is a separate clip 9 that provides for retention of the finger follower 1 on an associated hydraulic lash adjuster assembly.

A more cost-effective solution would be desirable that provides an anti-rotation feature for the coupling pin as well as the retention feature.

SUMMARY

A clip for a switchable roller finger follower that includes a retainer for a hydraulic lash adjuster and an anti-rotation feature that prevents rotation of a coupling pin is provided. The switchable roller finger follower includes an inner lever having a first end and a second end and an outer lever that includes two outer arms that extend along longitudinal sides of the inner lever and a dome-shaped recess on a bottom surface of the outer lever arranged towards the second end of the inner lever. The inner lever is mounted for pivoting movement on the outer lever at the first end of the inner lever by a pivot axle. A coupling device is located on one of the inner lever or the outer lever on an end opposite from the pivot axle that includes a coupling pin. The coupling pin includes a coupling flat and is arranged to move in a longitudinal direction between a locking position, in which the inner lever and the outer lever are connected together for movement at least in an activation direction of a valve, and an unlocked position, in which the inner lever is pivotable relative to the outer lever. A coupling projection with a coupling surface is located on the other of the inner lever or the outer lever from the coupling device, and the coupling flat of the coupling pin engages with the coupling surface in the locking position. The clip includes a first leg arranged adjacent to the dome-shaped recess on the bottom surface of the outer lever that includes the retainer for the hydraulic lash adjuster, and a second leg of the clip includes an anti-rotation bar that extends laterally across part of the coupling pin and prevents rotation of the coupling pin.

Preferred arrangements with one or more features of the invention are described below and in the claims.

BRIEF DESCRIPTION OF THE DRAWINGS

The foregoing summary as well as the following detailed description will be best understood when read in conjunction with the appended drawings. In the drawings.

DETAILED DESCRIPTION OF THE PREFERRED EMBODIMENTS

Figure 1:
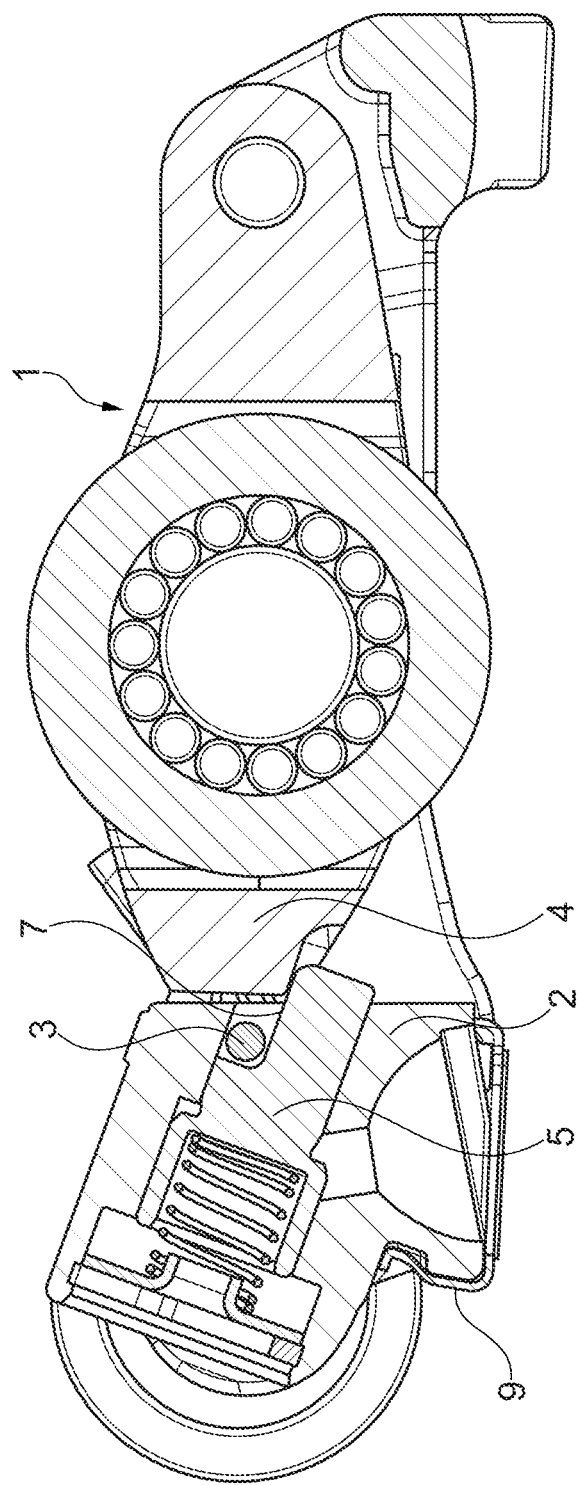
FIG. 1 is a side cross-sectional view of a switchable roller finger follower according to the prior art.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
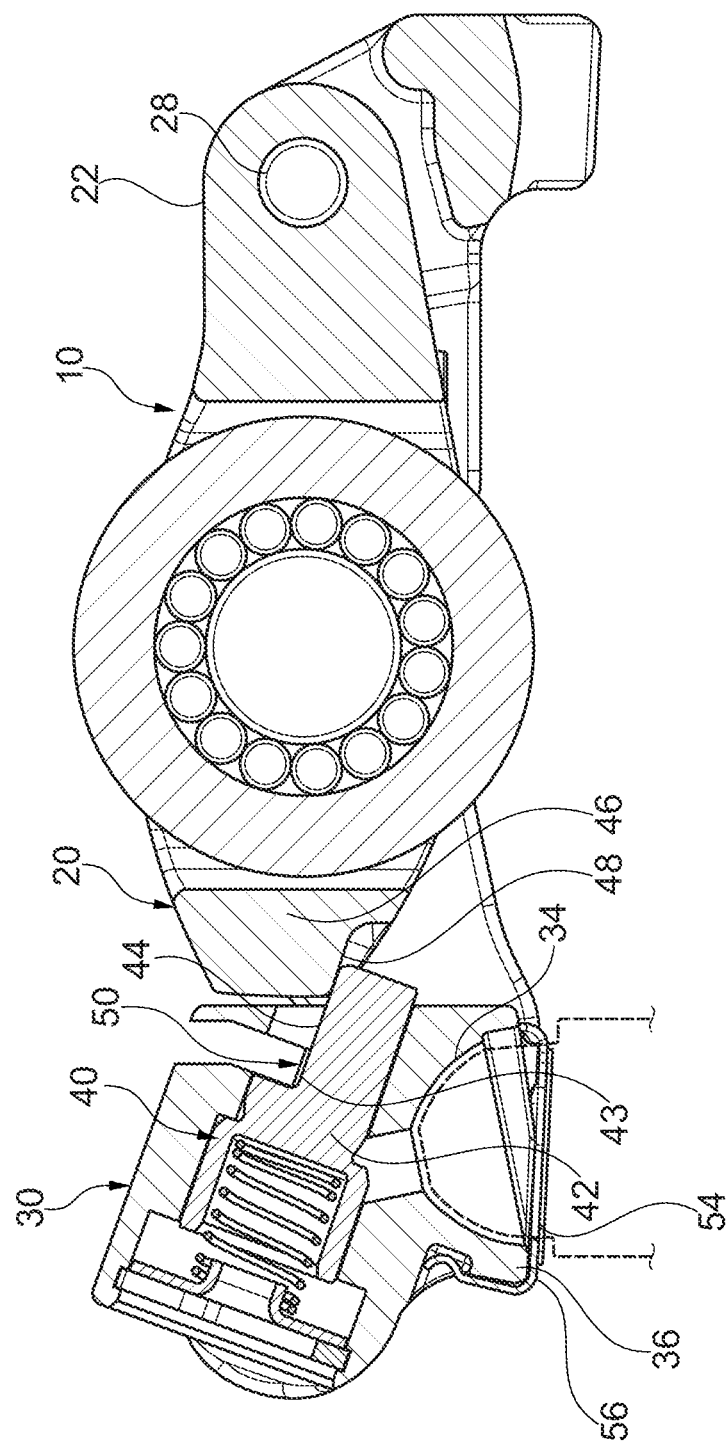
FIG. 2 is a side cross-sectional view of a switchable roller finger follower according to a first embodiment.
Figure 3:
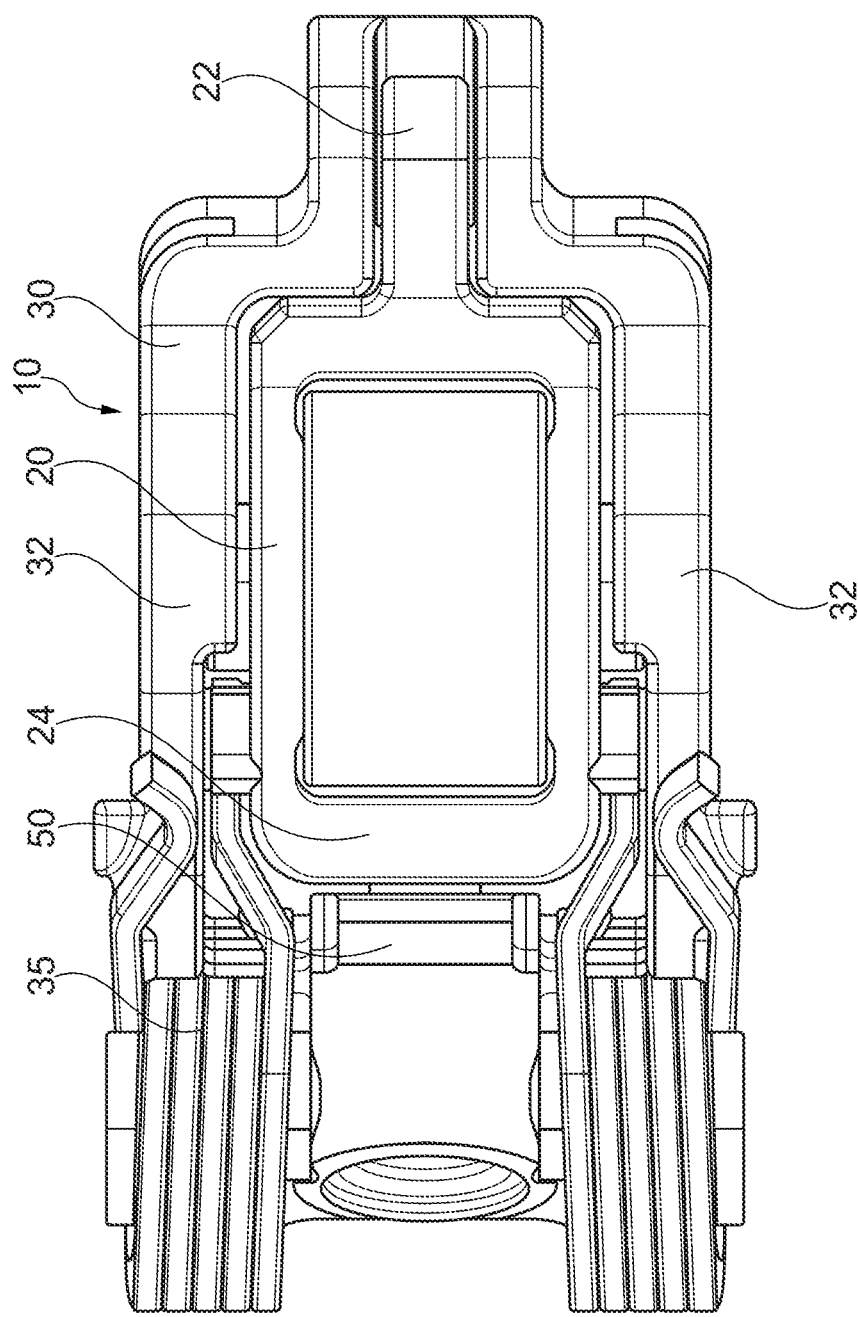
FIG. 3 is a top view of the switchable roller finger follower of FIG. 2.

As shown in FIGS. 2 and 3, a first embodiment of a switchable roller finger follower 10 is provided. The switchable roller finger follower 10 includes an inner lever 20 having a first end 22 and a second end 24. The switchable roller finger follower 10 preferably includes a cam contact surface, illustrated in the form of a roller, however there could just be a sliding surface as well. As shown in FIGS. 2 and 3, the switchable roller finger follower 10 includes an outer lever 30 with two outer arms 32 that extend along longitudinal sides of the inner lever 20. A dome-shaped recess 34 is located on a bottom surface 36 of the outer lever 30 towards the second end 24 of the inner lever 20. The dome-shaped recess 34 is configured to receive a hydraulic lash adjuster assembly (not shown). The inner lever 20 is mounted for pivoting movement on the outer lever 30 at the first end 22 of the inner lever 20 by a pivot axle 28.

A coupling device 40 is located on one of the inner lever 20 or the outer lever 30 on an end opposite from the pivot axle 28 that includes a coupling pin 42 having a coupling flat 44. The coupling pin 42 is arranged to move in a longitudinal direction between a locking position, in which the inner lever 20 and the outer lever 30 are connected together for movement at least in an activation direction of a valve, and an unlocked position, in which the outer lever 30 is pivotable relative to the inner lever 20. In the illustrated embodiment, this movement is carried out by a spring that biases the coupling pin 42 in the locking position shown in FIG. 2, and pressurized hydraulic fluid that moves the coupling pin 42 to the unlocked position.

A coupling projection 46 includes a coupling surface 48 located on the other of the inner lever 20 or the outer lever 30 from the coupling device 40. The coupling flat 44 of the coupling pin 42 engages with the coupling surface 48 in the locking position. As shown in FIG. 2, in the illustrated embodiment the coupling device 40 is located on the outer lever 30, and the coupling projection 46 is formed on the inner lever 20. One of ordinary skill in the art would recognize from the present disclosure that alternative configurations of the coupling device and coupling projection could be used. As shown in FIG. 3, a lost motion spring 35 is connected between the inner lever 20 and the outer lever 30. This takes up the movement of the inner lever 20 relative to the outer lever 30 when the coupling pin 42 is in the unlocked position.

Figure 4:
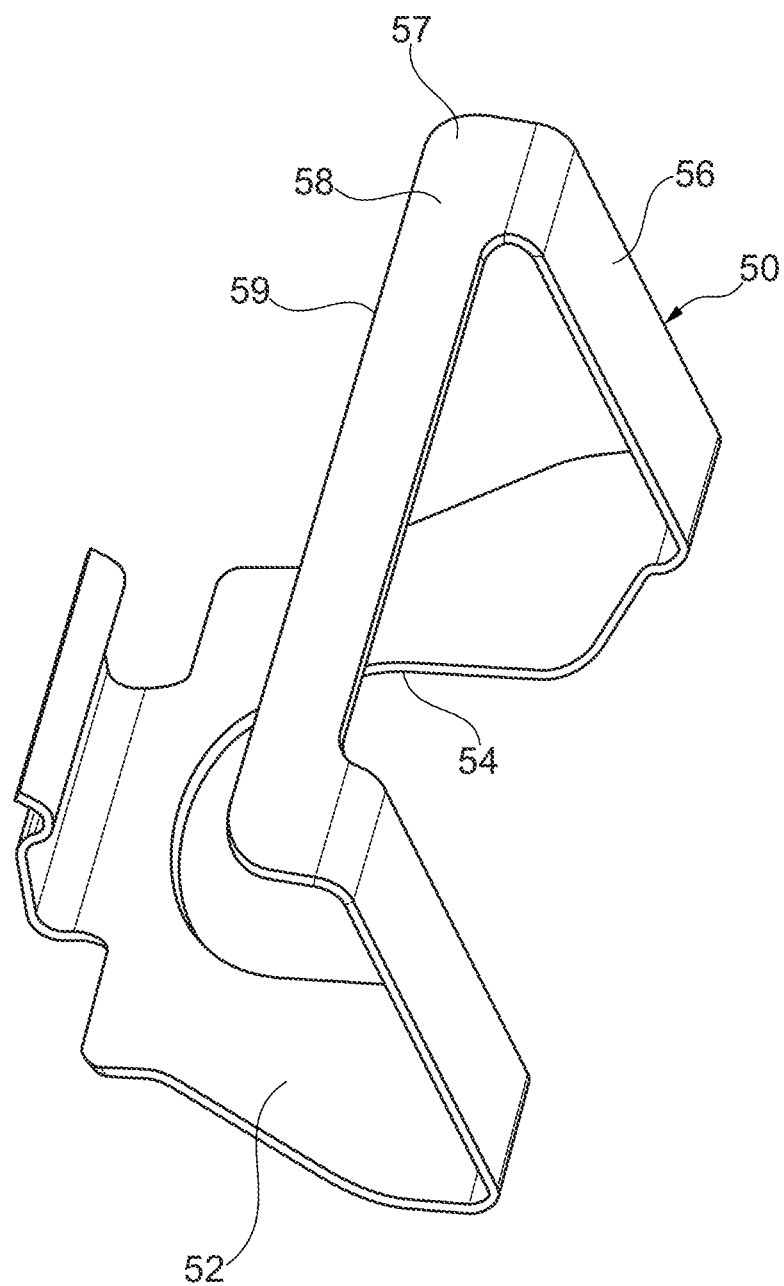
FIG. 4 is a perspective view of a clip for the switchable roller finger follower of FIGS. 2 and 3.

As shown in FIGS. 2 and 4, a clip 50 is provided that includes a first leg 52 arranged adjacent to the dome-shaped recess 34 on the bottom surface 36 of the outer lever 30 that includes a retainer 54 for a hydraulic lash adjuster (shown in broken lines). The clip 50 is preferably formed from spring steel. One of ordinary skill in the art would recognize from the present disclosure that other suitable materials can be used for the clip 50. The retainer 54 includes a semi-circular edge having a complementary profile to a profile of the dome-shaped recess 34 on the bottom surface 36 of the outer lever 30 that is adapted to engage under the head of the hydraulic lash adjuster. A second leg 56 of the clip 50 includes an anti-rotation bar 58 that extends laterally across a part 43 of the coupling pin 42 and prevents rotation of the coupling pin 42. As shown in FIG. 2, in the first embodiment the part 43 of the coupling pin 42 that contacts the anti-rotation bar 58 is the coupling flat 44. This part 43 of the coupling pin 42 slides against a flat surface of the anti-rotation bar 58 of the clip 50 through a full range of motion for the coupling pin 42, and this part 43 of the coupling pin 42 (i.e. the coupling flat 44) and the anti-rotation bar 58 overlap each other in both the locked position and the unlocked position. One of ordinary skill in the art would recognize from the present disclosure that the anti-rotation bar 58 and the part 43 of the coupling pin 42 can have other complementary profiles that are non-round to prevent rotation of the coupling pin 42, such as a projection and complementary recess for the projection.

The anti-rotation bar 58 of the clip 50 is preferably formed at a terminal end portion 57 of the second leg 56. As shown in FIGS. 2 and 4, the anti-rotation bar 58 is formed as a bent flange 59 at the terminal end portion 57 of the second leg 56. The bent flange 59 is arranged parallel to the coupling flat 44 of the coupling pin 42.

Figure 5:
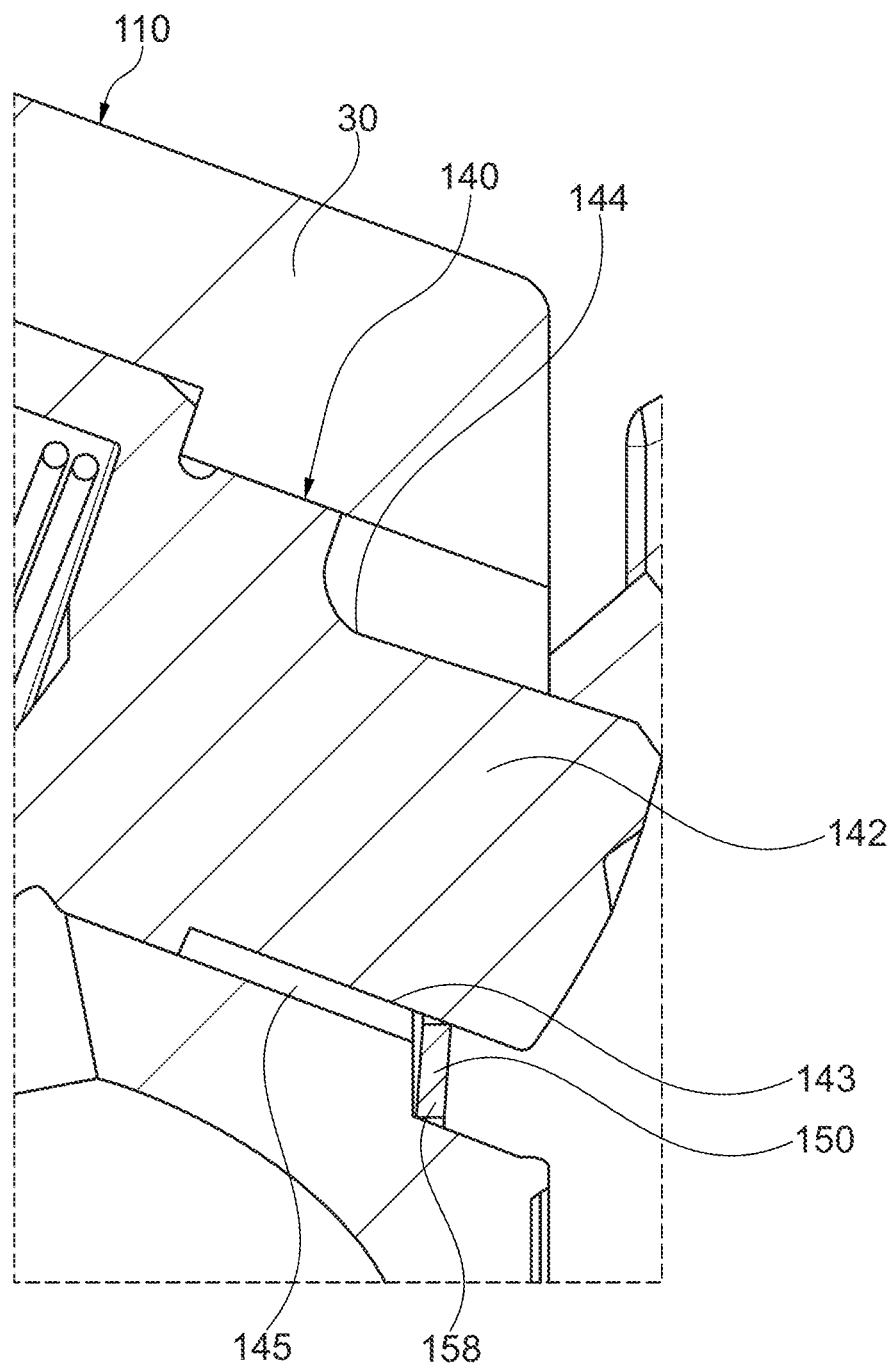
FIG. 5 is an enlarged view of a coupling device for a switchable roller finger follower according to a second embodiment.
Figure 6:
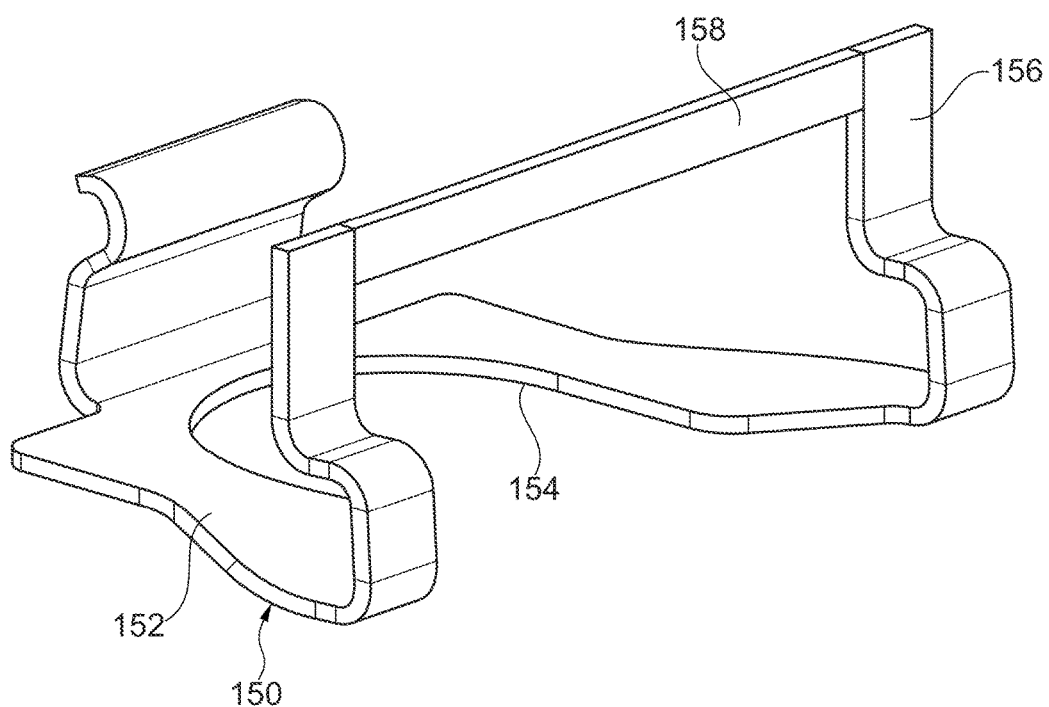
FIG. 6 is a perspective view of a clip for the switchable roller finger follower of FIG. 5.

A second embodiment of the switchable roller finger follower 110 is shown in FIGS. 5 and 6. The features not discussed herein with respect to the second embodiment are identical to the first embodiment of the switchable roller finger follower 10, and only modifications with respect to the coupling device 140 and the clip 150 are described herein. In the second embodiment of the switchable roller finger follower 110, the part 143 of the coupling pin 142 that contacts the anti-rotation bar 158 of the clip 150 is a secondary flat 145 located on an opposite side of the coupling pin 142 from the coupling flat 144. The secondary flat 145 of the coupling pin 142 and the anti-rotation bar 158 overlap each other in both the locked position and the unlocked position. As shown in FIG. 6, the clip 150 includes a first leg 152 including a retainer 154 for the hydraulic lash adjuster and a second leg 156 that includes the anti-rotation bar 158.

One of ordinary skill in the art would recognize from the present disclosure that other configurations of the clips 50, 150 are possible. The shape, profile, material, size, thickness, and other characteristics of the clips 50, 150 can be modified while still providing the dual features of anti-rotation for the coupling pin and retention of the hydraulic lash adjuster.

A method for retaining a hydraulic lash adjuster and preventing rotation of a coupling pin 42 in a switchable roller finger follower 10 is also provided. The method includes providing a switchable roller finger follower 10 including an inner lever 20 having a first end 22 and a second end 24, and an outer lever 30 with two outer arms 32 that extend along longitudinal sides of the inner lever 20 and a dome-shaped recess 34 on a bottom surface 36 of the outer lever 30 arranged towards the second end 24 of the inner lever 20. The inner lever 20 is mounted for pivoting movement on the outer lever 30 at the first end 22 of the inner lever 20 by a pivot axle 28. The method includes arranging a coupling device 40 on one of the inner lever 20 or the outer lever 30 on an end opposite from the pivot axle 28. The coupling device 40 includes the coupling pin 42 having a coupling flat 44, and the coupling pin 40 is arranged to move in a longitudinal direction between a locking position, in which the inner lever 20 and the outer lever 30 are connected together for movement at least in an activation direction of a valve, and an unlocked position, in which the inner lever 20 is pivotable relative to the outer lever 30. The method includes providing a coupling projection 46 with a coupling surface 48 on the other of the inner lever 20 or the outer lever 30 from the coupling device 40, and the coupling flat 44 of the coupling pin 42 engages with the coupling surface 48 in the locking position. The method includes arranging a clip 50 on the switchable roller finger follower 10, the clip 50 including a first leg 52 arranged adjacent to the dome-shaped recess 34 on the bottom surface 36 of the outer lever 30 that includes a retainer 54 for a hydraulic lash adjuster, and a second leg 56 of the clip 50 includes an anti-rotation bar 58 that extends laterally across a part 43 of the coupling pin 42 and prevents rotation of the coupling pin 42.

Having thus described various embodiments of the present switchable roller finger follower in detail, it is to be appreciated and will be apparent to those skilled in the art that many changes, only a few of which are exemplified in the detailed description above, could be made in the finger follower without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS switchable roller finger follower 1
outer lever 2 needle 3
inner lever 4
coupling pin 5
coupling flat 7
clip 9
switchable roller finger follower 10
inner lever 20
first end 22
second end 24
pivot axle 28
outer lever 30
outer arms 32
dome-shaped recess 34
lost motion spring 35
bottom surface 36
coupling device 40
coupling pin 42
part 43
coupling flat 44
coupling projection 46
coupling surface 48
clip 50
first leg 52
retainer 54
second leg 56
terminal end portion 57
anti-rotation bar 58
bent flange 59
coupling pin 142
part 143
coupling flat 144
secondary flat 145
clip 150
first leg 152
retainer 154
second leg 156
anti-rotation bar 158

What is claimed is:

1. A switchable roller finger follower comprising:
an inner lever having a first end and a second end;
an outer lever with two outer arms that extend along longitudinal sides of the inner lever and a dome-shaped recess on a bottom surface of the outer lever arranged towards the second end of the inner lever, the inner lever mounted for pivoting movement on the outer lever at the first end of the inner lever by a pivot axle;
a coupling device located on one of the inner lever or the outer lever on an end opposite from the pivot axle that includes a coupling pin having a coupling flat, the coupling pin is arranged to move in a longitudinal direction between a locking position, in which the inner lever and the outer lever are connected together for movement at least in an activation direction of a valve, and an unlocked position, in which the inner lever is pivotable relative to the outer lever;
a coupling projection with a coupling surface located on the other of the inner lever or the outer lever from the coupling device, the coupling flat of the coupling pin engages with the coupling surface in the locking position; and
a clip including a first leg arranged adjacent to the dome-shaped recess on the bottom surface of the outer lever that includes a retainer for a hydraulic lash adjuster, and a second leg including an anti-rotation bar that extends laterally across a part of the coupling pin and prevents rotation of the coupling pin.

2. The switchable roller finger follower of claim 1, wherein the part of the coupling pin that contacts the anti-rotation bar is the coupling flat.

3. The switchable roller finger follower of claim 1, wherein the part of the coupling pin that contacts the anti-rotation bar is a secondary flat located on an opposite side of the coupling pin from the coupling flat.

4. The switchable roller finger follower of claim 3, wherein the secondary flat of the coupling pin and the anti-rotation bar overlap each other in both the locked position and the unlocked position.

5. The switchable roller finger follower of claim 1, wherein the coupling device is located on the outer lever, and the coupling projection is formed on the inner lever.

6. The switchable roller finger follower of claim 1, wherein the anti-rotation bar is formed at a terminal portion of the second leg.

7. The switchable roller finger follower of claim 6, wherein the anti-rotation bar is formed as a bent flange at the terminal portion of the second leg.

8. The switchable roller finger follower of claim 1, wherein the retainer includes a semi-circular edge having a complementary profile adapted to engage under a head of the hydraulic lash adjuster.

9. The switchable roller finger follower of claim 1, further comprising a lost motion spring connected between the inner lever and the outer lever.

10. The switchable roller finger follower of claim 1, wherein the part of the coupling pin and the anti-rotation bar overlap each other in both the locked position and the unlocked position.

11. The switchable roller finger follower of claim 1, wherein the anti-rotation bar and the part of the coupling pin have non-round complementary profiles.

12. The switchable roller finger follower of claim 1, wherein the clip is formed from spring steel.

13. The switchable roller finger follower of claim 1, wherein the clip includes a flat surface that is parallel to the part of the coupling pin.

14. A method for retaining a hydraulic lash adjuster and preventing rotation of a coupling pin in a switchable roller finger follower, the method comprising:
providing a switchable roller finger follower including an inner lever having a first end and a second end, and an outer lever with two outer arms that extend along longitudinal sides of the inner lever and a dome-shaped recess on a bottom surface of the outer lever arranged towards the second end of the inner lever, the inner lever mounted for pivoting movement on the outer lever at the first end of the inner lever by a pivot axle;
arranging a coupling device on one of the inner lever or the outer lever on an end opposite from the pivot axle, the coupling device includes a coupling pin having a coupling flat, the coupling pin is arranged to move in a longitudinal direction between a locking position, in which the inner lever and the outer lever are connected together for movement at least in an activation direction of a valve, and an unlocked position, in which the inner lever is pivotable relative to the outer lever;
providing a coupling projection with a coupling surface on the other of the inner lever or the outer lever from the coupling device, the coupling flat of the coupling pin engages with the coupling surface in the locking position; and
arranging a clip on the switchable roller finger follower, the clip including a first leg arranged adjacent to the dome-shaped recess on the bottom surface of the outer lever that includes a retainer for a hydraulic lash adjuster, and a second leg of the clip including an anti-rotation bar that extends laterally across a part of the coupling pin and prevents rotation of the coupling pin.

* * * * *